United States Patent [19]

Krzyminski

[11] 4,310,239

[45] Jan. 12, 1982

[54] REPRODUCTION CAMERA APPARATUS

[76] Inventor: Harald Krzyminski, Wiesenstr. 14, D-6240 Koenigstein, Fed. Rep. of Germany

[21] Appl. No.: 120,898

[22] Filed: Feb. 12, 1980

Related U.S. Application Data

[63] Continuation-in-part of Ser. No. 948,757, Oct. 5, 1978, abandoned.

[30] Foreign Application Priority Data

Oct. 7, 1977 [DE] Fed. Rep. of Germany ....... 2745115

[51] Int. Cl.³ .............................................. G03B 27/00
[52] U.S. Cl. ........................................ 355/18; 355/75; 355/43; 355/57; 355/60; 355/66
[58] Field of Search ....................... 355/43, 66, 57, 60, 355/18, 75

[56] References Cited

U.S. PATENT DOCUMENTS

| | | | |
|---|---|---|---|
| 1,728,102 | 9/1929 | Caps | 355/66 |
| 1,793,837 | 2/1931 | Caps | 355/60 |
| 3,398,638 | 8/1968 | Frohlich | 355/60 |

FOREIGN PATENT DOCUMENTS

| | | |
|---|---|---|
| 2353866 | 5/1974 | Fed. Rep. of Germany . |
| 1186604 | 8/1959 | France ................................ 355/66 |

*Primary Examiner*—Monroe H. Hayes
*Attorney, Agent, or Firm*—Kurt Kelman

[57] ABSTRACT

A reproduction camera apparatus comprises a light impermeable housing comprised of four walls and a partition wall intermediate two of the wall whereby the housing is divided into two compartments. A camera is mounted in the housing and a light source for illuminating an original to be reproduced is arranged in one compartment. A carriage is vertically displaceably mounted in the one compartment for displacement along a path in relation to the camera and a holder for the original is mounted on the carriage for movement in relation thereto. At least one of the walls defining the one compartment has an opening in alignment with the displacement path for enabling the holder to be moved into and out of the one compartment. A shielding element is associated with the opening and is displaceable with the carriage, the shielding element defining a slot through which the holder may be moved.

4 Claims, 5 Drawing Figures

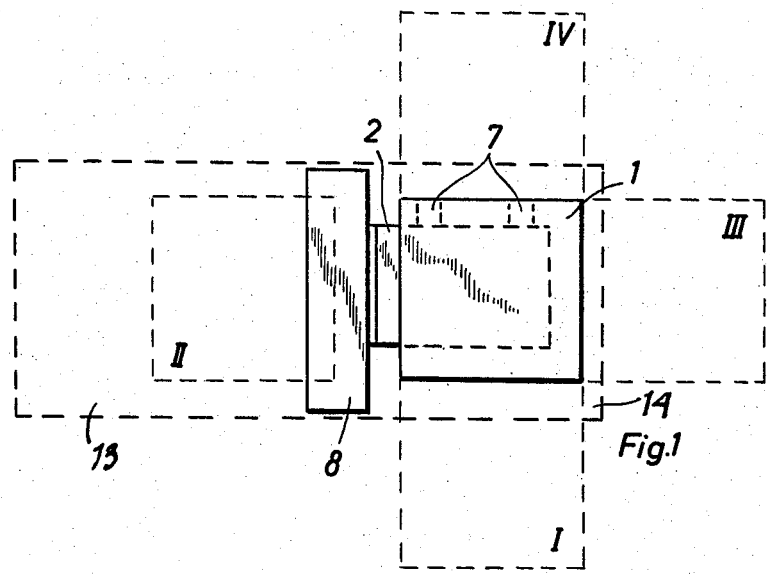
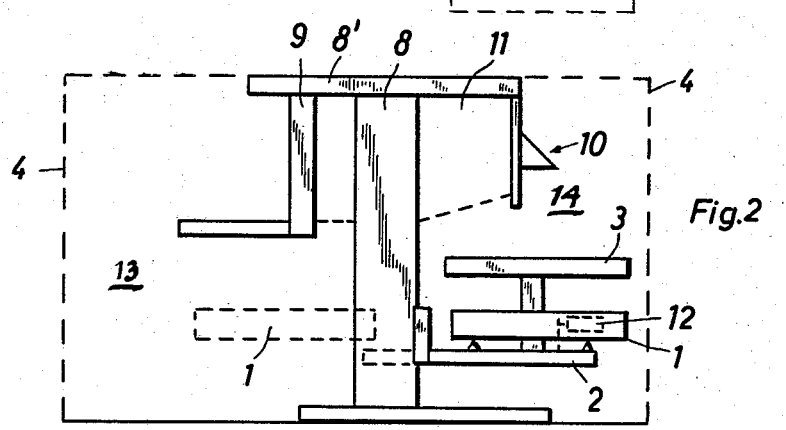
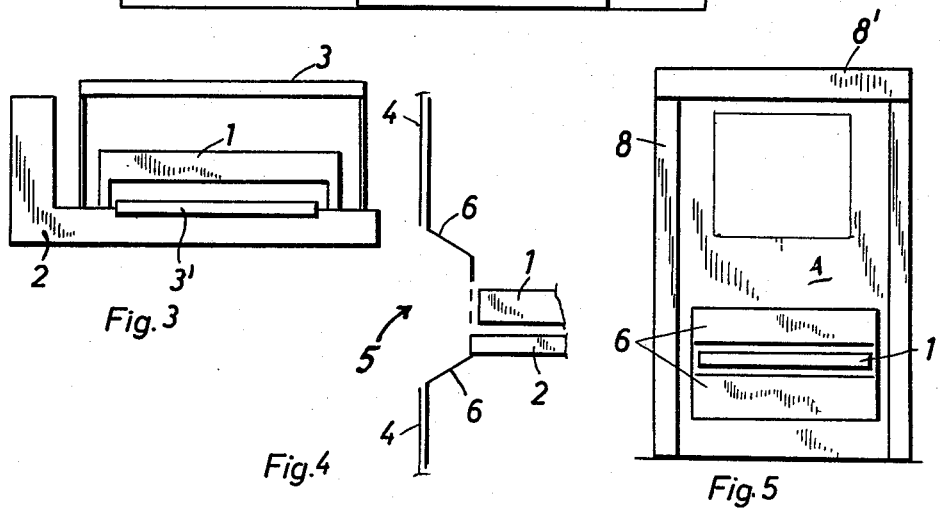

REPRODUCTION CAMERA APPARATUS

This is a continuation-in-part application of my copending U.S. patent application Ser. No. 948,757, filed Oct. 5, 1978, now abandoned.

The present invention relates to a reproduction camera apparatus for reproducing an original.

Known apparatus of this type comprises a closed housing substantially impermeable to light and containing a camera including a photographic optical system and a light source for illuminating an original exposed to the camera and displaceable along a path in relation to the optical system. The light source may provide transillumination and/or panoramic direct illumination, such as green-shining light elements providing a uniform and shadow-free lighting of the original which takes account of the spectral sensitivity of the film material exposed in the camera. Enclosing the exposure station has the advantage that, on the one hand, disturbing extraneous light is kept away from the original being reproduced and, on the other hand, the operator is not exposed to the illumination, which is of particular importance in the case of green light. However, the disadvantage of this known apparatus resides in the difficulty of moving the holder for the original into and out of the exposure station in the closed housing.

It is the primary object of this invention to improve reproduction camera apparatus of the indicated type by facilitating the movement of the holder for the original into and out of an enclosed exposure station.

The above and other objects are accomplished according to the invention with a reproduction camera apparatus for reproducing an original, which comprises a closed housing substantially impermeable to light and comprised of four walls and a partition wall intermediate two of the four walls whereby the housing is divided into two compartments. A camera including a photographic optical system is mounted in the housing and a light source for illuminating the original is arranged in one of the compartments. A carriage is displaceably mounted in the one compartment for displacement along a path in relation to the optical system for setting the required focussing position. A holder for the original is mounted on the displaceable carriage for movement in relation to the carriage. Preferably, the light source is arranged fixedly on the carriage to participate in its displacement but not in the movement of the holder. At least one of the walls of the housing defining the one compartment has an opening in alignment with the displacement path for enabling the holder to be moved into and out of the one compartment. A shielding element is associated with the opening and displaceable with the carriage, the shielding element defining a slot through which the holder may be moved.

With this arrangement, it is possible to move the holder for the original into and out of the one compartment while the light source remains therein, either from and to selected positions outside and adjacent the enclosed housing or from and to a position in the other housing compartment on the feed side of the camera, that is, into a position which lies in a dark space.

The above and other objects, advantages and features of the present invention will become more apparent from the following detailed description of a now preferred embodiment thereof, taken in conjunction with the accompanying schematic drawing wherein FIG. 1 is a diagrammatic plan view of a reproduction camera apparatus according to this invention, showing four positions into which the holder for the original may be moved;

FIG. 2 is a similar side elevational view of the apparatus;

FIG. 3 is an enlarged end view of a displaceable unit including a carriage, a holder for the original and light sources;

FIG. 4 shows a structural detail according to the invention; and

FIG. 5 is a front view of the partition wall and associated structure within the closed housing.

Referring now to the drawing, the reproduction camera apparatus for reproducing an original is shown to comprise a closed housing substantially impermeable to light and comprised of four walls 4 (shown in broken lines) and partition wall 4 (see FIG. 5) intermediate two of the four walls whereby the housing is divided into two compartments 13, 14. Camera 9 including a bellows casing 11 and a photographic optical system 10 is mounted in the housing, the illustrated camera extending through the partition wall with its feed end in dark compartment 13 and its optical system in exposure compartment 14. A light source for illuminating the original is arranged in the one compartment 14, the illustrated light source including direct panoramic illustrating element 3 and transillumination element 3' for selective use. Carriage 2 is vertically displaceably mounted in compartment 14 for displacement along a path in relation to optical system 10. In the illustrated apparatus, the optical system is arranged above the original and the displacement path is accordingly vertical but it will be obvious to those skilled in the art that optical system 10 may be horizontally spaced from the original, i.e. the arrangement may be turned by 90°, in which case the displacement path will extend horizontally.

Holder 1 for the original is mounted on displaceable carriage 2 for movement in relation to the carriage.

As appears clearly from FIGS. 2 and 5, support frame 8, 8' is mounted in the closed housing, partition wall 4 extending between the two side beams 8, 8 of the support while horizontal cross beam 8' holds the camera. Carriage 2 has a guide element at one end thereof and mounted for guided support on one of the side beams so that the carriage may be vertically displaced in relation to optical system 10. The light sources are shown arranged fixedly on carriage 2 above and below holder 1, respectively, for respective panoramic and transillumination, as selected.

FIGS. 1 and 2 in full lines show holder 1 in a photographing position in compartment 14 centered below optical system 10 and ready for an original on the holder to be illuminated and photographically reproduced. In broken lines, FIG. 1 also shows four selected positions I, II, III and IV into which holder 1 may be moved from compartment 14 or from which it may be moved into this compartment, position II for holder 1 also being shown in broken lines in FIG. 2. While three positions outside the closed housing are illustrated, in practice only one or at most two such positions will be provided to save unnecessary construction costs.

According to the present invention, at least one wall 4 defining compartment 14 has an opening 5 in alignment with the displacement path of carriage 2 for enabling holder 1 to be moved into and out of compartment 14 so as to assume a selected position I, II, III or IV. To prevent the diffusion of light into and out of this compartment through the opening, shielding element 6 is associated with opening 5 and is displaceable with carriage 2. The shielding element, as clearly shown in FIGS. 4 and 5, defines a slot through which holder 1 may be moved. In the illustrated embodiment, shielding element 6 is mounted on carriage 2 for displacement therewith to slide along opening 5. Thus, the opening will remain shielded in all positions of carriage 2 along its displacement path.

Suitable stop means, such as magnetic stops 7, are mounted along one edge of carriage 2 or holder 1 to limit the movement of the holder in relation to the carriage and to maintain holder 1 in an end position. FIG. 1 illustrates stops 7 arranged along an edge opposite position I to provide a movement limit with respect to this position. The stops will be arranged along other edges of the carriage or holder if the holder is to be moved into another one of the illustrated rest positions.

For movement in relation to carriage 2 (in a direction perpendicular to the drawing plane, as viewed in FIG. 3), holder 1 may be mounted on conventional telescoping guide rails running on rollers (not shown), such as used, for example, for extension drawers in file cabinets. Illumination elements 3, 3' are shown affixed to carriage 2 so that they do not participate in the movement of holder 1 but do not interfere with this movement. Motor drive 12 mounted on holder 1 with a gear transmission to carriage 2 may be used to move the holder, the same effect being obtained by mounting the motor drive on the carriage with the gear transmission to the holder.

What is claimed is:

1. A reproduction camera apparatus for reproducing an original, which comprises a closed housing substantially impermeable to light and comprised of four walls defining an exposure compartment, a camera including a photographic optical system mounted in the housing, a light source arranged in the exposure compartment of the housing for illuminating the original therein, a carriage displaceably mounted in the exposure compartment for displacement along a path in relation to the optical system, a holder for the original, the holder defining a plane and being mounted on the displaceable carriage for movement onto and off the carriage in said plane, at least one of the walls having an opening in alignment with the displacement path of the carriage and extending along the entire displacement path, the opening having a dimension enabling the holder to be moved into and out of the exposure compartment of the housing onto and off the carriage through the opening, and a light shielding element associated with the opening and displaceable with the carriage, the shielding element defining a slot through which the holder may be moved for passing through the wall opening.

2. The reproduction camera apparatus of claim 1, wherein the shielding element is mounted on the carriage for displacement therewith.

3. The reproduction camera apparatus of claim 1, further comprising stop means arranged to limit the movement of the holder in relation to the carriage.

4. The reproduction camera apparatus of claim 1 or 3, further comprising a motor drive means for moving the holder onto and off the carriage.

* * * * *